Oct. 12, 1948.                    B. M. TUXHORN                    2,451,453
            APPARATUS FOR CONTROLLING ROTATION OF VEHICLE WHEELS
Filed Aug. 14, 1944                                        3 Sheets-Sheet 3
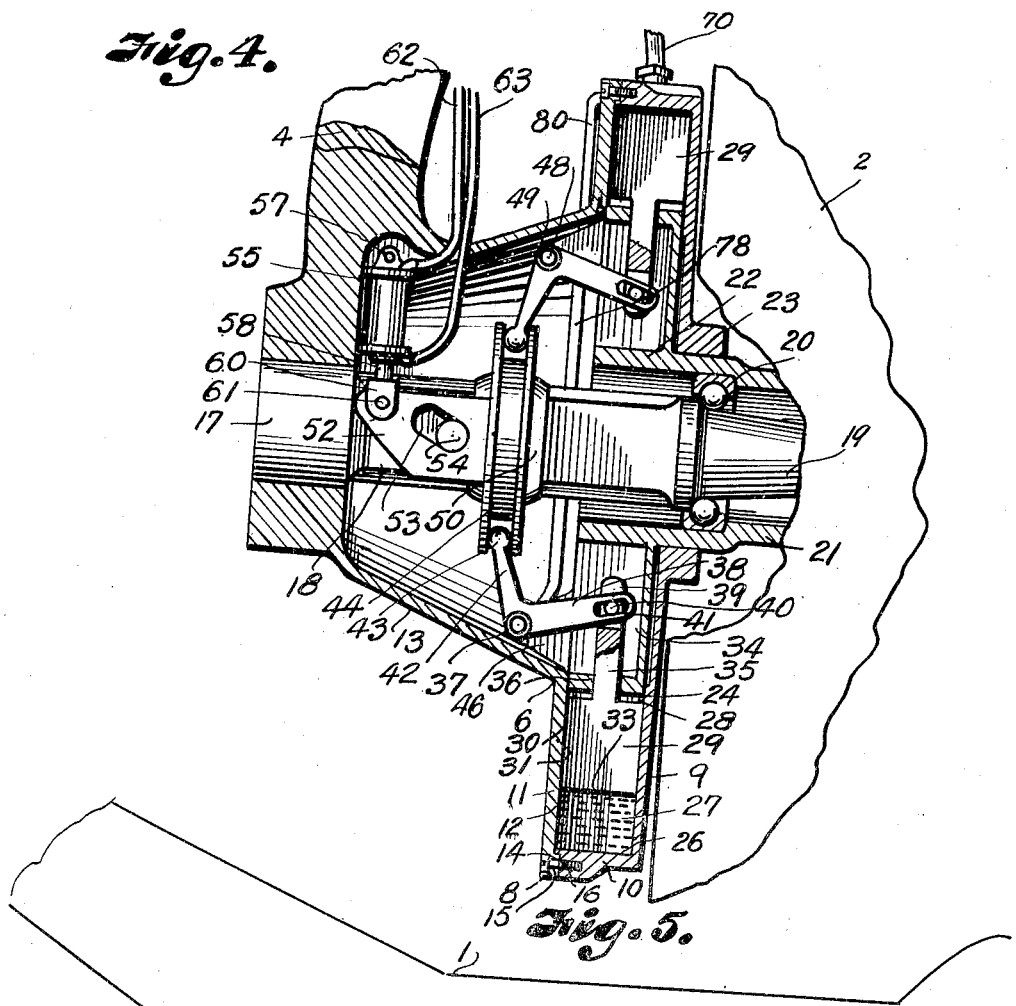
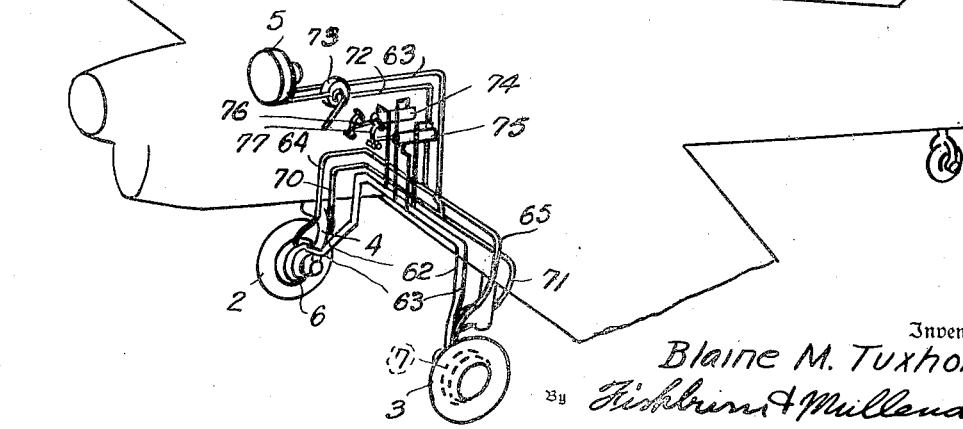
Inventor
Blaine M. Tuxhorn
By Fishburn & Mullendore
Attorneys Patented Oct. 12, 1948

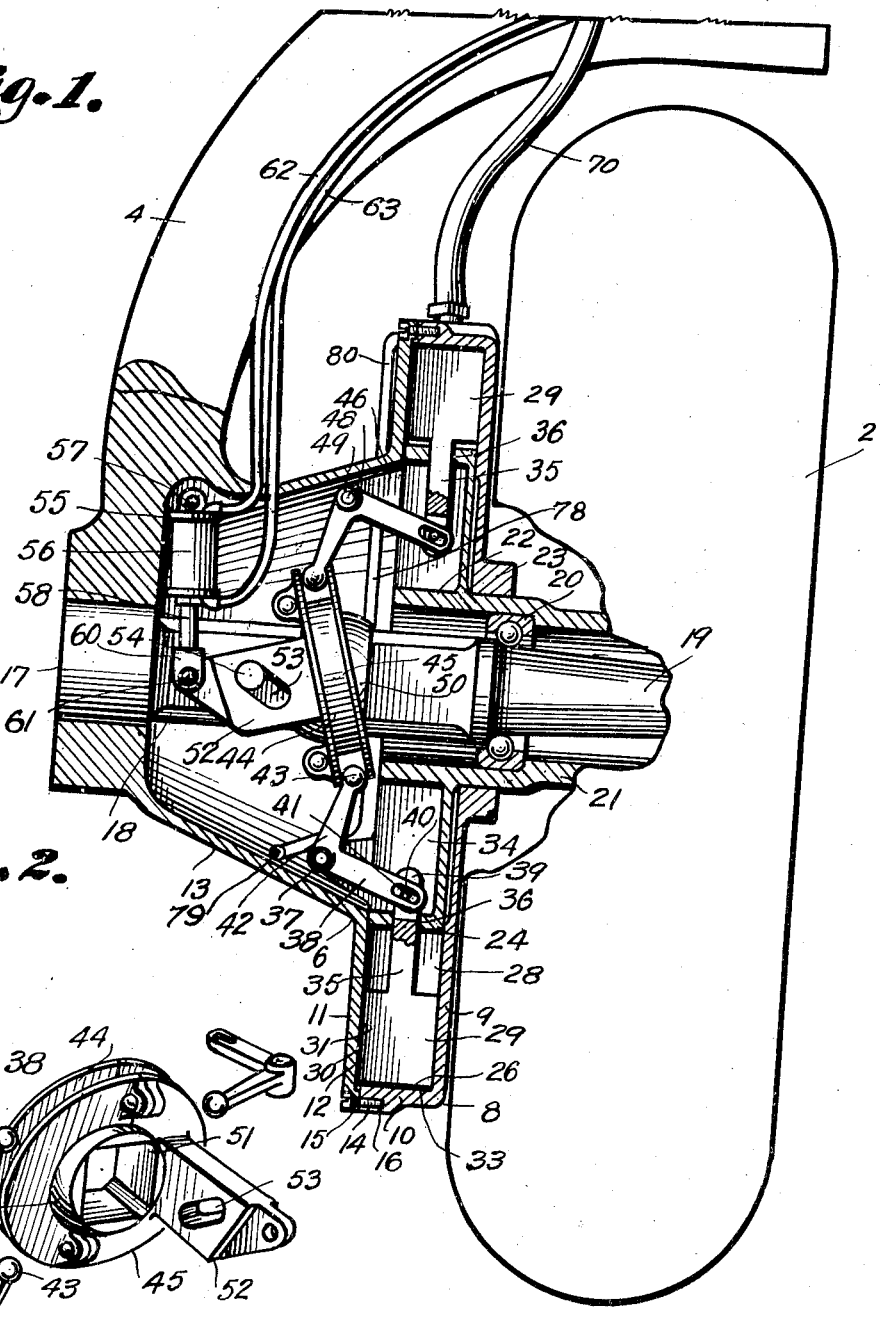

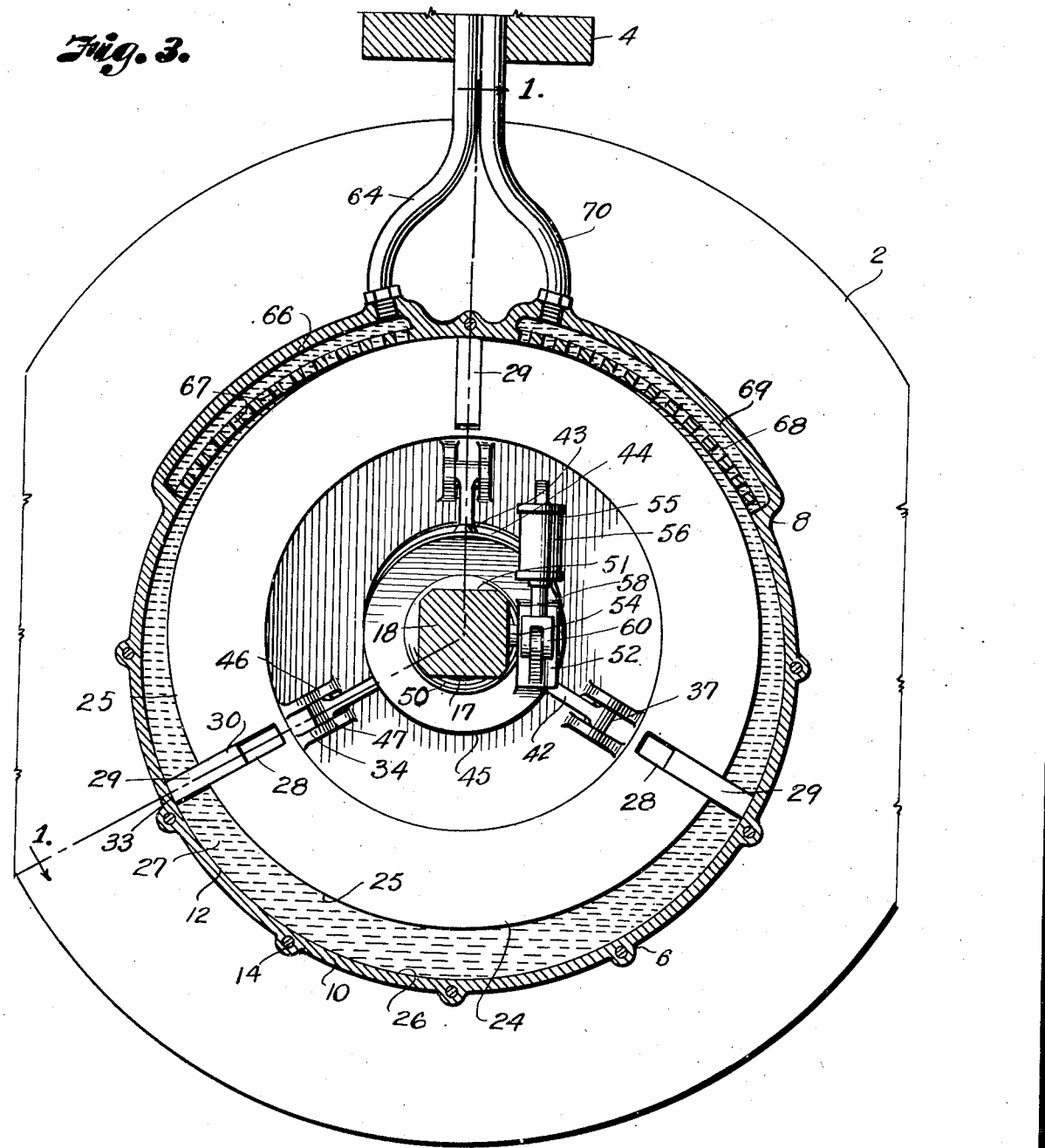

2,451,453

UNITED STATES PATENT OFFICE 2,451,453

APPARATUS FOR CONTROLLING ROTATION OF VEHICLE WHEELS

Blaine M. Tuxhorn, Kansas City, Mo.

Application August 14, 1944, Serial No. 549,409

10 Claims. (Cl. 244—103)

This invention relates to apparatus for rotating and controlling the wheels of vehicles, particularly the landing wheels of aircraft, and has for its principal objects to provide an apparatus of this character employing a pressure fluid to effect, prior to landing, rotation of the wheels at substantially landing speed of the aircraft so as to avoid dragging of the wheels and grinding away of the tread of the tires; to utilize the pressure fluid as a braking force in retarding rotation of the wheels after landing; and to control the braking force on the respective wheels without excessively heating the pressure fluid.

In carrying out the invention I contemplate a pump preferably actuated from the motive power of the aircraft for delivering the pressure fluid to rotors connected with the respective landing wheels and having blades against which the pressure fluid acts to effect rotation of the respective wheels. The invention also contemplates use of the pressure fluid to control rotational speed of the wheels and to apply a braking force after landing.

Therefore, further objects of the invention are to provide means for selectively retracting the blades within the rotors; to vary the effective blade area presented to the action of the pressure fluid for varying the speed of the wheels in correspondence with the approximate landing speed; and to control the effective resistance of the pressure fluid on the blades when the pressure fluid is throttled as when applying braking pressure, and to provide positive means under control of the pilot for effecting positive retraction and control of the blades.

In accomplishing these and other objects of the invention hereinafter pointed out, I have provided improved structure, the preferred form of which is illustrated in the accompanying drawings, wherein:

Fig. 1 is a front elevation of one of the landing wheels of an aircraft equipped with a wheel rotating and controlling mechanism embodying the features of the present invention and which is shown in section, the section being taken on the line 1—1, Fig. 3.

Fig. 2 is a perspective view of the actuating levers and collar actuating the blades of the wheel rotating and controlling mechanism.

Fig. 3 is a vertical section through the wheel rotating and controlling mechanism illustrating the rotor blades and actuating levers in elevation.

Fig. 4 is a fragmentary view similar to Fig. 1 but showing the blades of the rotor in fully retracted position to free the wheel from action of the pressure fluid.

Fig. 5 is a diagrammatic perspective view of an aircraft showing the piping connecting the pump with the wheel control motors and the pedal for positioning the blades in the rotors of the motors.

Referring more in detail to the drawings: 1 designates an aircraft having landing wheels 2 and 3 carried by brackets 4 that may be retractable within compartments provided on the underside of the wings, as in usual practice. It is well known that when an airplane of this character lands with the wheels stationary, the sudden contact of the tires with the landing field causes the wheels to drag for some distance before they reach a rotational speed corresponding to the landing speed of the airplane. The action produces a terrific grinding away of the thread of the tires and is particularly destructive when the airplane is of the large transport types. Furthermore, the stationary wheels produce a tendency for the airplane to tilt or nose over unless the force of the landing tending to rotate the wheels is equally distributed on the respective wheels.

The invention, therefore, contemplates the provision of the aircraft with an apparatus for starting rotation of the wheels prior to landing and to bring the rotational speed of the wheels to approximately landing speed, thereby avoiding the above noted objectionable effects.

In carrying out the invention, a pump 5 is mounted on the airplane and operatively connected with a source of power, such as one of the engines used in driving the propellers, the pump 5 being arranged to supply fluid under pressure to motors 6 and 7 associated with the respective wheels as now to be described.

Each motor includes a stator in the form of a cylindrical housing 8 supported by the wheel carrying brackets 4 eccentrically of the wheels 2 and 3. The housing 8 includes a plate-like section 9 having an annular laterally extending wall 10 on the periphery thereof facing adjacent the brackets 4 for mounting a plate section 11 cooperating to form the sides of an annular rotor chamber 12. Connected with the disk or plate section 11 and projecting therefrom is a hub-like housing 13 connected with the respective brackets 4. The plate section 11 is removably connected with the wall 10 by fastening devices, such as screws, 14 projected through openings 15 in the marginal edge of the disk and into threaded sockets 16 formed in bosses projecting outwardly from the wall 10 as best shown in Figs. 1 and 3.

Carried by each bracket 5 is a fixed axle 17 having a body portion 18 of substantially square cross section and terminating in a spindle 19 that carries the bearings 20 which mount the hubs 21 of the respective wheels. The hub 21 preferably has a cylindrical portion 22 projected through a collar 23 on the plate section 9, as shown in Fig. 1, to mount a rotor 24 which comprises a substantially disk-like body conforming in width to the rotor chamber and having a peripherial face 25 which cooperates with the inner face 26 of the rotor housing to form a substantially crescent-shaped passageway 27 therebetween. The rotor has a plurality of radial slots 28, here shown as three in number, for slidably retaining blade 29 having the sides 30 thereof arranged to move in sealing contact with the inner side faces 31 of the rotor chamber and their outer edges 33 in substantially sealing contact with the inner face 26 of the rotor chamber The slots 28 register with recesses 34 for accommodating blade actuating levers, later described. The blades 29 have stems 35 slidable in bearing openings 36 or the rotor. The stems 35 project into the recesses 34 and connect with the control levers which comprise bell cranks 37 having arms 38 extending through bifurcated ends 39 of the stems and which are connected thereto by transverse pins 40 which extend through slots 41 in the ends of the arms 38 to allow for radial movement of the blades and arcuate movement of the bell cranks. The other arms 42 of the bell cranks terminate in ball shaped ends 43 which engage in a raceway 44 of an actuating collar 45. The bell cranks are pivoted adjacent the juncture of the arms between pairs of ears 46 and 47 located on the respective sides of the recesses 34, the bell cranks being pivoted on pins 48 extending through the ears and through hub portions 49 of the bell cranks. The collar 43 is mounted to rock upon a substantially spherical bushing 50 that has an axial opening 51 conforming to the polygonal-shaped portion of the axle 17 whereby the bushing is slidable and tiltable on the axle to effect movement of the bell cranks for controlling the position of the blades with respect to the rotor. Rocking movement of the actuating collar on the bushing is required for the reason that the rotor is eccentric with respect to the axis of the rotor housing, and as the rotor rotates within the housing, the blades on top center position, as shown in Fib 3, must retain the same position regardless of the position of the remaining blades; therefore, means is provided for rocking the collar on the spherical bushing so as to maintain substantially fixed relationship of the upper portion of the collar while the lower portion is being rocked to move the bell cranks for retracting the blades within the slots of the rotor as later described.

In order to rock the collar and maintain fixed position of the upper portion thereof, it is necessary that the spherical bushing slide on the axle to accommodate a changing axial center of the collar while the collar rocks on the spherical bushing to retain the upper portion thereof in substantially fixed position relative to the rotor The collar is provided with a lever arm 52 extending from a face side thereof opposite the rotor and which has a slot 53 for accommodating a pin 54 on which the arm is caused to move for effecting desired shifting position to the collar The pin 54 is fixed to the axle and projects laterally therefrom a sufficient distance to extend through the slot 53. The arm may be rocked by any suitable mechanism, but the mechanism here illustrated comprises a hydraulic jack 55 which includes a cylinder 56 pivotally connected at one end with the bracket 4 as indicated at 57. The jack also includes a piston (not shown) slidable in the cylinder and having a rod 58 carrying a yoke 60 that straddles the terminal end of the arm 54 and is pivotally connected therewith by a transverse pin 61. A pressure fluid is supplied to the respective ends of the cylinder through ducts 62 and 63 leading to control cylinders, later described.

The pump 5 may be of any suitable type capable of delivering a required volume of pressure medium to the respective motors. However, the pump is preferably constructed similar to the motor just described so that the output of the pump may be controlled through manipulation of the blades to vary the effective area thereof acting on the pressure fluid. Pressure fluid is delivered from the pump through a duct 63 that is connected with the respective motors through branch ducts 64 and 65, the branch ducts connecting with manifold chambers 66 of substantially arcuate form and which connect with one end of the crescent chamber 27 through a plurality of ports 67. The pressure medium is discharged from the motor through similar ports 68 located at the opposite end of the crescent shaped chamber and into an arcuate manifold 69 for return to the pump through branch lines 70 and 71 connected by a common line 72 with the inlet of the pump. The flow of pressure fluid through the respective lines 63 and 72 is controlled by a common valve 73 having the required ports, but which specifically forms no part of the present invention. The ducts 62 and 63 from the respective jacks connect with the respective ends of control cylinders 74 and 75 having pistons therein individually manipulated by separate operating pedals 76 and 77 whereby the pistons in the control cylinders are selectively positioned to support the blades in desired projecting position within the crescent-shaped passageway of the motors, or to completely retract them within the rotor.

In using the apparatus constructed and assembled as described and assuming that the airplane is about to land, the pilot will cause projection of the blades of the pump or otherwise make the pump 5 effective for delivering fluid medium under pressure through the line 63 and branches 64 and 65 to the manifold 66 for discharge through the ports 67 leading to the crescent-shaped passageways. The pressure fluid acts on the blades nearest the enlarged portions of the passageways to cause movement of the rotor in an anti-clockwise direction (Fig. 3). The pressure fluid thus moves between the blades through the crescent-shaped passageways and discharges from the motors through ports 68 into the manifolds 69 to branch pipes 70 and 71 and common pipe 72 for return to the pump 5. The volume of flow may be regulated by the control valve 73 so that the rotors drive the wheels 2 and 3 at a speed corresponding to the landing speed of the airplane.

Just prior to the landing, the foot pedals 76 may be operated to cause hydraulic fluid in the lines 62 and 63 to act on the pistons within the jacks 55 to rock the collars 45 from the position shown in Fig. 1 to the position shown in Fig. 4. During this movement the upper portion of the collars nearest the ends of the crescent-shaped passageways remain in substantially fixed position but by reason of the ball mounting of the collar and the pin 54 and slot 53 the lower portion of the collar is caused to swing to the left, Fig. 1, and thereby rock the bell crank levers 37 so that the arms 38 thereof move inwardly to forcibly retract the blades of the rotors, whereupon the wheels rotate freely and independently of the rotors and pressure fluid for the reason that the effective portions of the blades are completely retained within the slots 28. It is thus obvious that the wheels are then freely rotating at speed corresponding with the landing speed of the plane. Consequently, the wheels will immediately start rolling upon the runway and there will be no dragging or excessive abrasion of the tires as would be the case if the airplane lands with stationary wheels. The valve 73 may then be adjusted to throttle flow from the respective motors after which the foot pedals 76 and 77 are operated to cause projection of the blades of the rotors into the crescent-shaped passageways so that the action thereof against the fluid produces a braking action on the wheels to slow down the plane after landing. If desired, the braking action is readily released by effecting withdrawal of the blades. When the plane slows to the desired speed the blades are withdrawn into the rotors so that the wheels are again free to roll responsive to taxiing of the plane by the propellers. The plane may be locked in stationary position by projecting the blades and closing the valve 73 so that the pressure fluid is trapped between the blades of the rotors and the valve 73.

When starting the plane for a take-off the blades of the rotors are withdrawn from the crescent-shaped passageways so that the wheels are free to rotate responsive to movement of the plane by the propellers. Attention is directed to the fact that the spacing of the blades of the rotors and the relative length of the intake and discharge port areas are such that there is no build-up on the fluid between the blades as the interposed bodies of fluid are propelled toward the discharge ports. In other words, when one of the blades passes the last of the intake ports the preceding blade in the direction of rotation has reached lower center position and the volume of fluid trapped between said blades is equal to that trapped between the next preceding blade, and as a blade moves upwardly from the lower position to displace the fluid the preceding blade has passed the first of the discharge ports. It is possible that pressure fluid may leak into the portion 13 of the motor housing, and to effect removal thereof I provide a pipe 78 having an inlet 79 located adjacent the lower portion of the housing port 13 and which has discharge into the intake manifold 66, as indicated at 80, through a check valve 81.

From the foregoing it is obvious that I have provided an apparatus for effectively rotating the wheels of a vehicle, such as an airplane or the like, and which may be utilized for controlling the rotational speed thereof in substantial correspondence with the landing speed and that the control apparatus may be used for quickly retarding movement of the plane on a landing field without excessive wear upon the tires or any tendency of the plane to be thrown out of balance. It is obvious that since the respective motors are independently regulated to the desired landing speed or the braking forces may be adjusted to maintain the airplane in the desired course during landing.

What I claim and desire to secure by Letters Patent is:

1. An apparatus of the character described including a stator having an annular rotor chamber and a housing extending from one side thereof, a rotor in said chamber, means rotatably supporting the rotor eccentrically within the rotor chamber for providing a passageway between said rotor and stator, blades movably carried by the rotor and movable through said passageway when the rotor rotates within the stator, means for supplying a pressure medium to one end of the passageway to act on said blades, means for discharging the pressure medium from the other end of the passageway, means in said housing for shifting the blades in said passageway to vary the effective area of said blades exposed to the action of said pressure medium, a member having a race-way, means mounting said member for axial and tilting movement with respect to the axis of the rotor, levers connected with the blades and having engagement with the race-way of said member for moving the blades transversely of the passageway to vary the effective area exposed to said pressure medium, and means for moving said member.

2. An apparatus of the character described including a stator having an annular rotor chamber and a housing extending from one side thereof, a rotor in said chamber, means rotatably supporting the rotor eccentrically within the rotor chamber for providing a substantially crescent shaped passageway between said rotor and stator, blades movably carried by the rotor and movable through said passageway when the rotor is rotated within the stator, means for supplying a pressure medium to one end of the passageway to act on said blades, means for discharging the pressure medium from the other end of the passageway, a member having a race-way, means mounting said member for axial and tilting movement with respect to the axis of the rotor, levers connected with the blades and having engagement with the race-way of said member for moving the blades transversely of the passageway to vary the effective area exposed to said pressure medium, and means for moving said member.

3. An apparatus of the character described including a stator having an annular rotor chamber, a rotor in said chamber, means rotatably supporting the rotor eccentrically within the rotor chamber for providing a substantially crescent shaped passageway between said rotor and stator, blades movably carried by the rotor and movable through said passageway when the rotor is rotated within the stator, means for supplying a pressure medium to one end of the passageway to act on said blades, means for discharging the pressure medium from the other end of the passageway, a member having a race-way, means mounting said member for axial and tilting movement with respect to the axis of the rotor, levers connected with the blades and having engagement with the race-way of said member for moving the blades transversely of the passageway to vary the effective area exposed to said pressure medium, and means for moving said member.

4. An apparatus of the character described including a stator having an annular rotor chamber, a rotor in said chamber, means rotatably supporting the rotor eccentrically within the rotor chamber for providing a substantially crescent shaped passageway between said rotor and stator, blades movably carried by the rotor and movable through said passageway when the rotor rotates within the stator, means for supplying a pressure medium to one end of the passageway to act on said blades, means for discharging the pressure medium from the other end of the passageway, a collar having a race-way, means mounting the collar for axial and tilting movement with respect to the axis of the rotor, levers pivoted on the rotor and connected with the blades and having engagement with the race-way of the collar for moving the blades transversely of the passageway to vary the effective area exposed to said pressure medium, and means for moving the collar.

5. An apparatus of the character described including a stator having an annular rotor chamber, a rotor in said chamber, means rotatably supporting the rotor eccentrically within the rotor chamber for providing a substantially crescent shaped passageway between said rotor and stator, blades movably carried by the rotor and movable through said passageway when the rotor is rotated within the stator, means for supplying a pressure medium to one end of the passageway to act on said blades, means for discharging the pressure medium from the other end of the passageway, a collar having a race-way, means mounting the collar for axial and tilting movement with respect to the axis of the rotor, levers connected with the blades and having engagement with the race-way of the collar for moving the blades transversely of the passageway to vary the effective area exposed to said pressure medium, an arm fixed to the collar and having a cam slot, a pin having fixed support relatively to the stator and engaged in said slot, and means for moving said arm to effect movement of the collar.

6. An apparatus of the character described including a stator having an annular rotor chamber, a rotor in said chamber, means rotatably supporting the rotor eccentrically within the rotor chamber for providing a substantially crescent shaped passageway between said rotor and stator, blades movably carried by the rotor and movable through said passageway when the rotor is rotated within the stator, means for supplying a pressure medium to one end of the passageway to act on said blades, means for discharging the pressure medium from the other end of the passageway, a member having a race-way, means mounting said member for axial and tilting movement with respect to the axis of the rotor, levers connected with the blades and having engagement with the race-way of said member for moving the blades transversely of the passageway to vary the effective area exposed to said pressure medium, and hydraulic means for moving said member.

7. Means for effecting and controlling rotation of a landing wheel of an aircraft including, a rotor, means supporting the rotor, a stator having a chamber containing the rotor and cooperating therewith to form a passageway, means for supplying a pressure medium to one end of the passageway, means for discharging the pressure medium from the other end of the passageway, and means for adjustably positioning the blades in the rotor to vary the effective areas of the blades exposed to action of the pressure medium in said passageway, said last named means including a collar having a raceway, a substantially spherical bushing for mounting said collar for axial and tilting movement with respect to the axis of the rotor, levers connected with the blades and having engagement with the raceways of said collar, and means for moving said collar.

8. Means for effecting and controlling rotation of a landing wheel of an aircraft including, a rotor, means supporting the rotor, a stator having a chamber containing the rotor and cooperating therewith to form a substantially crescent shaped passageway, blades movably carried by the rotor and movable through said passageway, means for supplying a pressure medium to one end of the passageway, means for discharging the pressure medium from the other end of the passageway, and means for adjustably positioning the blades in the rotor to vary the effective areas of the blades exposed to action of the pressure medium in said passageway, said last named means including a collar having a raceway, a substantially spherical bushing for mounting said collar for axial and tilting movement with respect to the axis of the rotor, levers connected with the blades and having engagement with the raceways of said collar, and means for moving said collar.

9. Means for effecting and controlling rotation of the landing wheels of an aircraft including, rotors for each wheel, means supporting the rotors for rotation with the respective wheels, stators having chambers containing the rotors and cooperating therewith to form substantially crescent shaped passageways, blades movably carried by the rotors and movable through said passageways, means for supplying a pressure medium to one end of the passageways, means for discharging the pressure medium from the other ends of the passageways, and individual means for independently shifting the blades in the respective rotors to vary the effective areas of the blades exposed to action of the pressure medium in said passageways, whereby a braking action is applied to said wheels after they have contacted the ground.

10. Means for effecting and controlling rotation of the landing wheels of an aircraft including, rotors for each wheel, means supporting the rotors for rotation with the respective wheels, stators having chambers containing the rotors and cooperating therewith to form substantially crescent shaped passageways, blades movably carried by the rotors and movable through said passageways, means for supplying a pressure medium to one end of the passageways, means for discharging the pressure medium from the other ends of the passageways, individual means for independently shifting the blades in the rotors to vary the effective areas of the blades exposed to action of the pressure medium in said passageway, means for throttling the pressure medium discharged from said passageway, and means for projecting said blades into said passageway to apply braking action on said wheels after they have contacted the ground.

BLAINE M. TUXHORN.

REFERENCES CITED

The following references are of record in the file of this patent:

UNITED STATES PATENTS

| Number | Name | Date |
|---|---|---|
| 728,860 | Campus | May 26, 1903 |
| 1,008,202 | Schmucker | Nov. 7, 1911 |
| 1,021,338 | Rush | Mar. 26, 1912 |
| 2,054,207 | Staats | Sept. 15, 1936 |
| 2,222,144 | Ferris | Nov. 19, 1940 |
| 2,347,986 | Bowerman | May 2, 1944 |
| 2,365,126 | Vickers | Dec. 12, 1944 |
| 2,381,842 | Schwend | Aug. 7, 1945 |

FOREIGN PATENTS

| Number | Country | Date |
|---|---|---|
| 214,377 | Germany | Oct. 14, 1909 |
| 782,542 | France | Mar. 18, 1935 |